Dec. 9, 1924.
T. G. SMITH
TOOL FOR REMOVING BOLTS, KEYS, ETC
Original Filed March 24, 1923
1,519,067
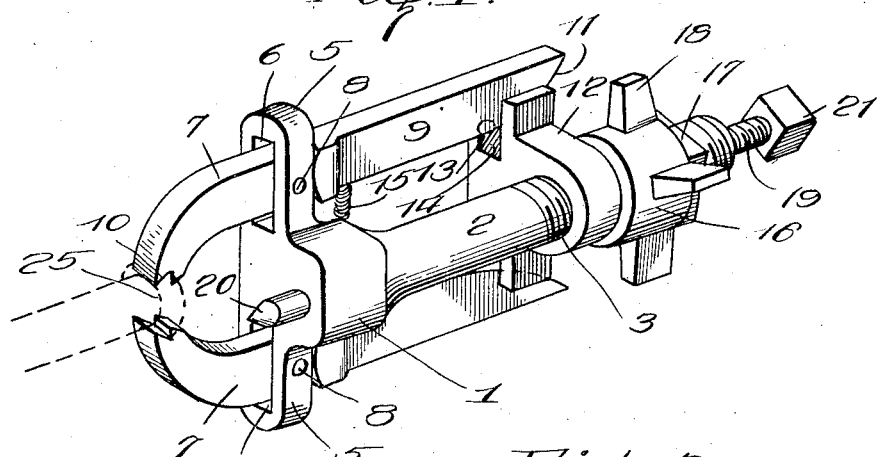
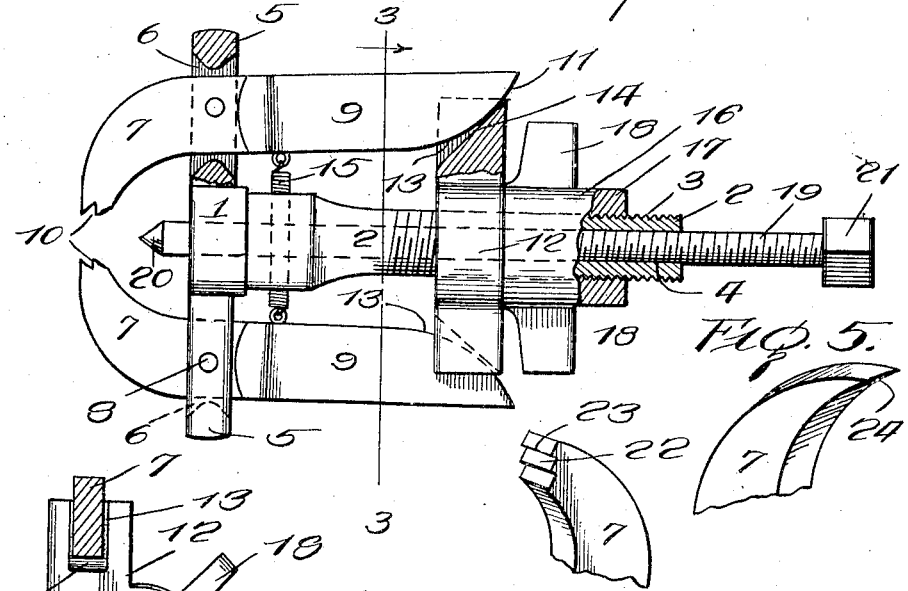
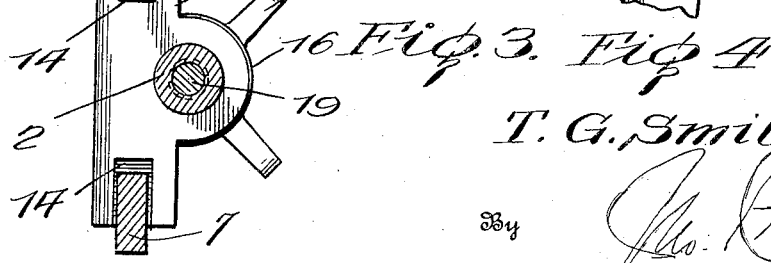
Inventor
T. G. Smith
By
Attorney Patented Dec. 9, 1924.

1,519,067

UNITED STATES PATENT OFFICE.

THOMAS G. SMITH, OF COFFEE CREEK, MONTANA.

TOOL FOR REMOVING BOLTS, KEYS, ETC.

Application filed March 24, 1923, Serial No. 627,436. Renewed October 6, 1924.

*To all whom it may concern:*

Be it known that I, THOMAS G. SMITH, a citizen of the United States of America, residing at Coffee Creek, in the county of Fergus and State of Montana, have invented certain new and useful Improvements in Tools for Removing Bolts, Keys, Etc., of which the following is a specification.

This invention relates to an improvement in that type of implements or tools, designed for the convenient withdrawal of bolts, keys, or the like, from fixtures, or for the holding of bolts or the like in applying or removing nuts, or for cutting the heads from bolts or the like.

The improved implement is of a portable nature, involving gripping levers, formed at their cooperative ends for the particular work in hand, together with means whereby the gripping or other desired action of the levers may be secured with that force necessary for the result desired.

The implement also includes what may be termed a pressure element, operating through the head of the implement and adapted to engage the surface adjacent the key or bolt to be withdrawn, the said pressure element being operative to force the implement as a whole, and thereby the gripped bolt or key, from the fixture to readily displace or withdraw such bolt or key.

The invention is illustrated in the accompanying drawings, in which:

Fig. 1 is a perspective view of the improved implement.

Fig. 2 is a plan, partly in section of the same.

Fig. 3 is a section on line 3—3 of Fig. 2.

Fig. 4 is a perspective view of the operative end of a different form of gripping lever.

Fig. 5 is a similar view of another form of lever.

The improved implement as here shown, comprises a head 1, having a stem 2 exteriorly threaded at 3 and formed with a longitudinally extending interiorly threaded bore 4, which opens through the upper end of the head. The head is formed in offset relation to the stem 2 with oppositely projecting sections 5 formed with openings 6 to loosely receive the gripping levers 7. These levers are pivotally supported in the sections 5 on pins 8 which are readily removable to permit the application of different types of levers when desired, and as will later appear. The operative ends of the levers beyond the head curve toward each other and have operative gripping faces 10, those shown in Fig. 1 being a series of sharp biting edges. In the opposite direction from the sections 5, the levers are extended as bars 9 with their relatively inner edges at their remote ends cut away or inclined at 11, these inclined edges being preferably slightly rounded. A follower 12 is slidable on the stem 2 and is formed in a laterally extended portion with recesses 13 having their inner walls 14 inclined as shown. These recesses 13 are arranged to receive the ends of the levers 7, with the edges 11 of such levers bearing on the inclined edges 14 of the follower, and held in such contact by a spring 15 connected to the respective levers immediately adjacent the head 1. An adjusting member 16 is threaded upon the stem 3, bearing at the upper end against the follower, so that the latter may be adjusted longitudinally of the stem through the movement of the adjusting member. This member may be exteriorly formed as at 17 to receive a wrench, and may be additionally provided with radial projections 18 to permit the application of considerable power when desired.

A pressure element in the form of a threaded rod 19 cooperates with the threaded bore 4 of the stem 2. That end of the element 19 adjacent the operative ends of the levers is preferably formed to provide a center punch terminal 20, while the opposite end of the member has a head 21 for the application of a wrench.

In Fig. 4 a slightly different type of lever is shown in that the gripping face 22 has a series of fine serrations 23 to grip an element to be withdrawn, as a key or the like. In Fig. 5, the operative face of the lever is shown as a cutting edge 24, to permit cutting a bolt or other element when desired.

In use, the operative ends of the levers are arranged adjacent the head of the bolt, as at 25, and a follower 12 is forced upwardly by operation of the adjusting member, until the bolt head is tightly gripped, whereupon the bolt may be withdrawn by pulling upon the implement, or if such pull does not displace the bolt, the pressure element may be threaded longitudinally of the stem of the implement, and engage the surface of the fixture adjacent the bolt and force the bolt out. This pressure element is particularly useful in withdrawing keys, as after gripping the key, the pressure element will engage the shaft end to exert a pulling pressure upon the key.

The levers 7 are readily removable from the head, to permit the insertion of other types of levers such as shown or as may be contemplated, it being clear that the spring 15 is readily disconnectible from a particular pair of levers so that it may be used with other sets of levers as desired.

What I claim is:

1. In an implement of the class described, a head, a stem carried thereby, gripping levers pivotally supported in the head, a follower movable on the stem and cooperating with the levers to move the gripping ends of said levers together, means movable on the stem to actuate the follower, and a pressure element operative from beyond the stem, said element projecting beyond the head and toward the gripping ends of the levers.

2. In an implement of the class described, a head having a stem formed with a longitudinal bore, gripping levers pivotally supported in said head, means for normally holding the gripping ends of said levers spaced apart, means operative on said stem to force the gripping ends of said levers toward each other, and a pressure element operative in the bore of said stem and relative to the gripping ends of said levers.

3. In an implement of the class described, a head having an exteriorly threaded stem formed with an interiorly threaded bore, levers pivotally supported on the head, a follower movable longitudinally of the stem and operating to force the gripping ends of said levers toward each other, an adjusting member threaded on the stem to operate the follower, and a rod cooperating with the threaded bore of the stem and having an operative end projecting beyond the head.

4. In an implement of the class described, a head, lateral projections therefrom formed with openings, gripping levers arranged in said openings, removable means engaging the projections for pivotally supporting the levers, a stem projecting from and forming part of said head, a follower movable on the stem and formed with guideways to receive the ends of the levers, the bottom of the guideways being inclined to move the levers as the follower is moved, means having threaded connection with the stem to move the follower, and a pressure element operative in the bore of the stem and projecting through the head toward the gripping ends of the levers.

In testimony whereof I affix my signature.

THOMAS G. SMITH. [L. S.]